United States Patent Office 3,215,728
Patented Nov. 2, 1965

3,215,728
CARBONYL COMPOUNDS CONTAINING A
HINDERED PHENOL GROUP
Eric A. Meier, Jackson Heights, and Martin Dexter,
White Plains, N.Y., assignors to Geigy Chemical Corporation, Greenburgh, N.Y., a corporation of Delaware
No Drawing. Original application Jan. 5, 1962, Ser. No.
164,619. Divided and this application Apr. 12, 1963,
Ser. No. 276,687
3 Claims. (Cl. 260—473)

This is a division of the copending parent application Serial No. 164,619, filed January 5, 1962.

This invention relates to certain 3,5-dialkyl-4-hydroxyphenyl succinic acid esters. In particular, the invention concerns the compounds of Formula I

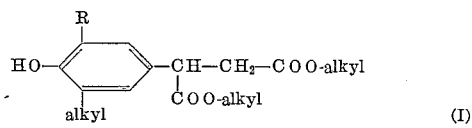

wherein R is a secondary or tertiary alkyl group, preferable t-butyl or isopropyl but including any other secondary or tertiary alkyl group, of from 4 to 24 carbon atoms.

By the term "akyl" in Formula I is intended any straight or branched hydrocarbon group having from 1 to 24 carbon atoms, such as for example, methyl, ethyl propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc.

The 3,5-dialkyl-4-hydroxyphenyl substituted organic compounds of the Formula I are used as stabilizers for organic material normally subject to deterioration caused by heat, light, oxygen, ozone, and other physical and/or chemical forces tending to cause degradation, embrittlement, gum or sludge formation, discoloration and other undesirable effects in a variety of organic materials, e.g. lubricating oils and fuel oils, and in general, oils of mineral, vegetable or animal origin, waxes, soaps, greases, gasolines, natural and synthetic rubbers, resins and plastics, such as polymers of hydrocarbons, e.g. ethylene and propylene, etc.

An object of this invention is to provide a novel chemical process for preparing the compounds of the Formula I. A further object is to provide a process which comprises contacting a 3,5-dialkyl-4-hydroxybenzene compound, suitable to yield a derivative of the Formula I above, with an appropriate compound of the Formula III (hereinbelow) in the presence of a base catalyst and a solvent, such as a difficultly esterifiable alcohol, to yield the desired organic compound of the Formula I. The difficultly esterifiable alcohol is preferably a lower alkanol, especially a tertiary lower alkanol, e.g. t-butanol, t-pentanol, t-hexanol, t-heptanol, t-octanol. In this specification "lower" alkanols have up to 8 carbon atoms. Other objects of this invention will be apparent from the description and specification which follows.

It has now surprisingly been found that the foregoing objects of the invention are realized by the process which comprises reacting a compound of the formula:

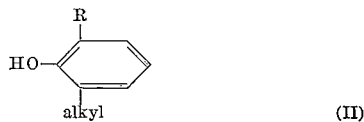

in which R is as above defined, with a compound of the formula

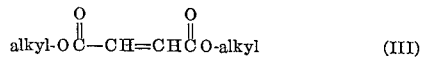

in the presence of a basic catalyst such as a quaternary ammonium base, e.g. benzyltrimethylammonium methoxide or such as alkali metal amides, e.g. sodamide, or alkali metal alkoxides—preferably an alkali metal lower alkoxide, e.g. sodium or potassium methoxide, ethoxide, n-propoxide, isopropoxide, n-butoxide, sec-butoxide, t-butoxide, pentoxide, hexoxide, heptoxide, octyloxide, etc., or alkali metal hydroxides, e.g. sodium or potassium hydroxide. The alkaline earth metal alkoxides or hydroxides are also useful.

The compounds of Formulae II and III and the base catalyst are reacted in a suitable solvent which can be either one of the reacting compounds of Formulae II or III which may or may not be present in equimolar amounts, or an auxiliary solvent which may be an aliphatic alcohol, preferably a difficultly esterifiable alcohol such as a tertiary alkanol, e.g. tertiary butanol, or an ether type solvent such as tetrahydrofuran, or a suitable amide such as dimethyl formamide, or a suitable ketone, such as acetone.

Compounds of the Formula II are prepared by alkylation of phenol and by other known methods. Certain compounds of the Formula II are available commercially, e.g. 2,6-di-tert.-butylphenol. Examples of compounds of the Formula II where are useful are the following:

6-t-butyl-o-cresol,
6-(1,1,3,3-tetramethylbutyl)o-cresol,
2-sec-butyl-6-t-butylphenol,
2,6-bis(1,1-dimethyl-n-proyl)phenol,
2,6-bis(1-methyl-n-nonyl)phenol,
2-(1,1,3,3-tetramethyl-n-butyl)-6-methylphenol, etc.

A wide range of temperatures from 25° C. (at atmospheric pressure) to 200° C. (at elevated pressures) may be employed to bring about the desired addition. The preferred range of temeperatures is 40° to 110° C.

The reaction may be conducted at 1:1 molar concentrations of the two reactants of Formulae II and III. Large excesses of the activated olefin of Formula III should be avoided in order to prevent side reactions.

Any suitable catalyst concentrations, e.g. from 0.01 to 100 mole percent, based on the phenol (II) concentration, may be employed, though preferred are mole percents of 5 to 25%.

Any suitable mode of addition may be employed although it has been found most practical to add the activated olefin of Formula III last to prevent its homopolymerization particularly at elevated temperatures.

Optimum results are obtained when air or oxygen is excluded or substantially reduced in amount from the atmosphere immediately in contact with the reactants. This can be accomplished in various ways, e.g. by blanketing the reactants in the reaction vessel with an inert gas such as nitrogen. Alternatively, a reaction vessel is chosen whereby the reactants, solvent, catalyst, etc. substantially fill the vessel. In a reaction in a closed vessel, air may be swept out with an inert gas such as nitrogen before introducing the reactants, etc. into the reaction vessel.

The following example illustrates the invention but is not meant to limit the same thereto; in said example, unless otherwise indicated, parts are by weight and the relationship of parts by weight to parts by volume is as

Preparation of diethyl α-(3,5-di-tertiary butyl-4-hydroxyphenyl)succinate

To 500 parts by volume of dry tertiary butyl alcohol is added 2.1 parts of potassium metal. Upon completion of the reaction 45.9 parts of 2,6-di-tertiary butyl phenol followed by 41.7 parts of diethyl maleate are rapidly added. The resulting system is refluxed for 20 hours and then allowed to cool. The reaction mixture is concentrated under reduced pressure to remove most of the solvent and then neutralized with diluted hydrochloric acid. The resulting mass is then extracted with two times 200 parts by volume portions of ether and the combined ethereal solutions with two times 100 parts by volume portions of water. The ethereal solution is then dried over anhydrous sodium sulfate and then concentrated on the steam bath. The residual oil is distilled collecting the fraction boiling from 164–174° under 0.1 mm. Hg pressure. The product, diethyl α-(3,5-di-tertiary butyl-4-hydroxyphenyl)succinate, crystallizes on standing to a low melting solid.

Analysis:

|  | C | H |
|---|---|---|
| Calculated for $C_{22}H_{34}O_5$ | 69.81 | 9.05 |
| Found | 69.78 | 9.26 |

If in this example, other dialkyl maleate esters are employed, then the respective dialkyl succinate derivatives are obtained: methyl, propyl, butyl amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc.

What is claimed is:
1. Compounds of the formula:

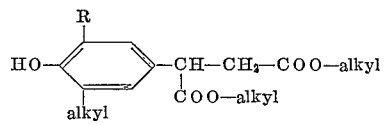

wherein R is a member selected from the group consisting of secondary alkyl and tertiary alkyl.

2. Compounds of the formula:

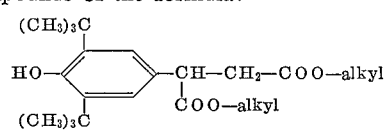

3. Diethyl α-(3,5-di-t-butyl-4-hydroxyphenyl)succinate.

References Cited by the Examiner

UNITED STATES PATENTS

| 2,202,877 | 6/40 | Stevens et al. | 260—624 |
| 3,029,276 | 4/62 | Hausweiller et al. | 260—473 |
| 3,112,338 | 11/62 | Smutny et al. | 260—473 |

OTHER REFERENCES

Bowden et al.: J. Am. Chem. Soc., 62, pp. 2422–3 (1940).

Fischer et a.: Chem. Zentr. (1916), II, p. 1025; B 50, p. 614.

Hlasiwitz: Justus Liebigs Ann der Chem., 102, pp. 151–161 (1910).

Nargund et al.: J. Univ. Bombay, 7, Pt. 3, pp. 196–202 (1938).

LORRAINE A. WEINBERGER, *Primary Examiner.*
LEON ZITVER, *Examiner.*